April 26, 1927.
G. J. BOWMAN
HAY LOADER
Filed March 13, 1926
1,626,178
2 Sheets-Sheet 2
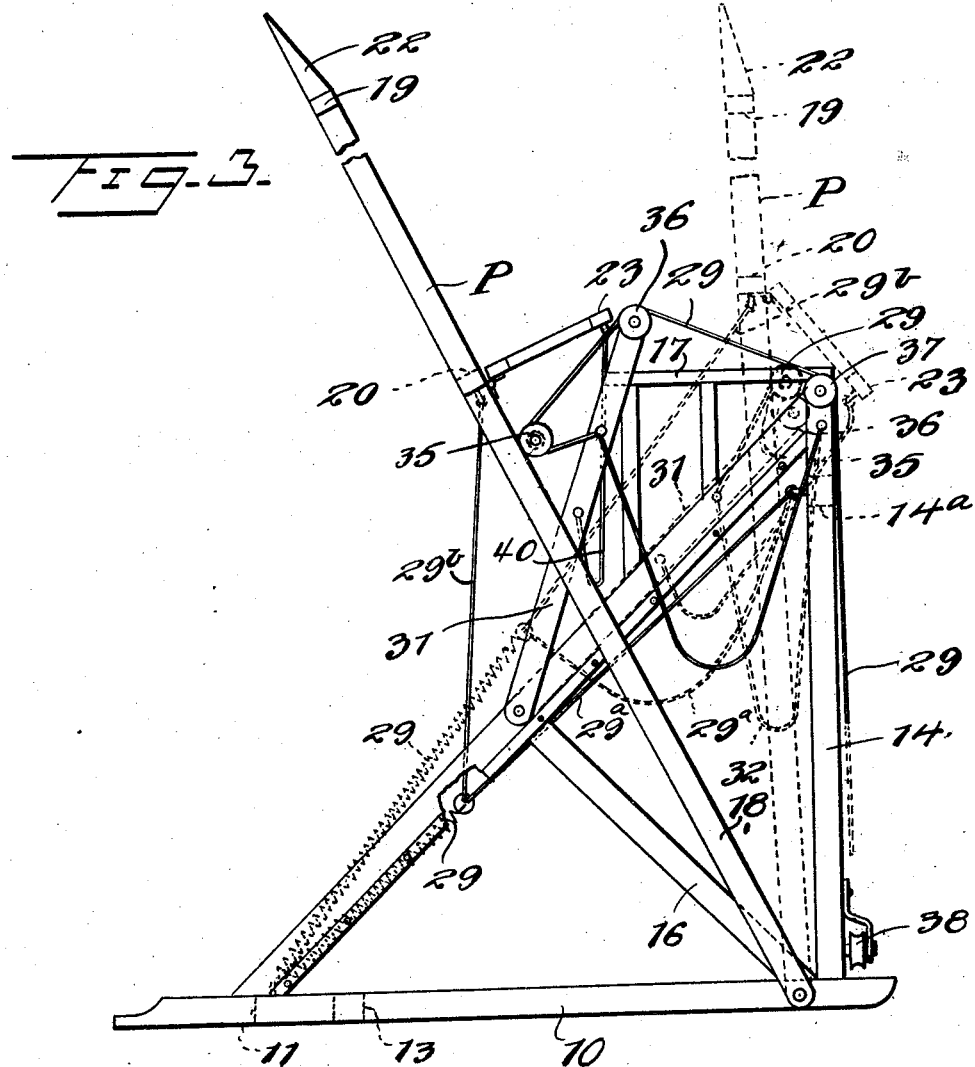
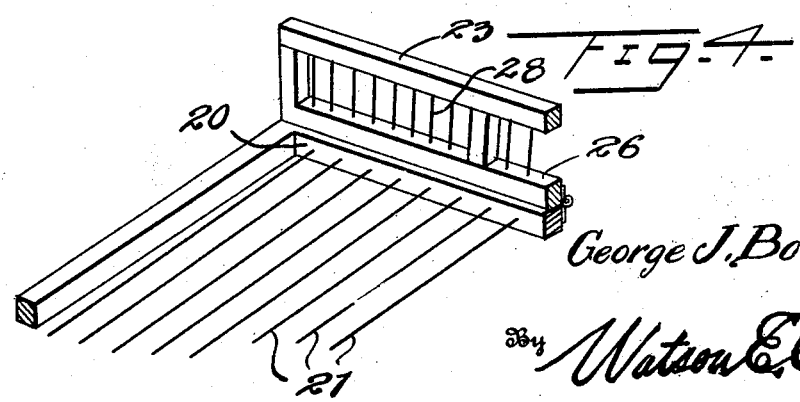
Inventor
George J. Bowman
By Watson E. Coleman
Attorney Patented Apr. 26, 1927.

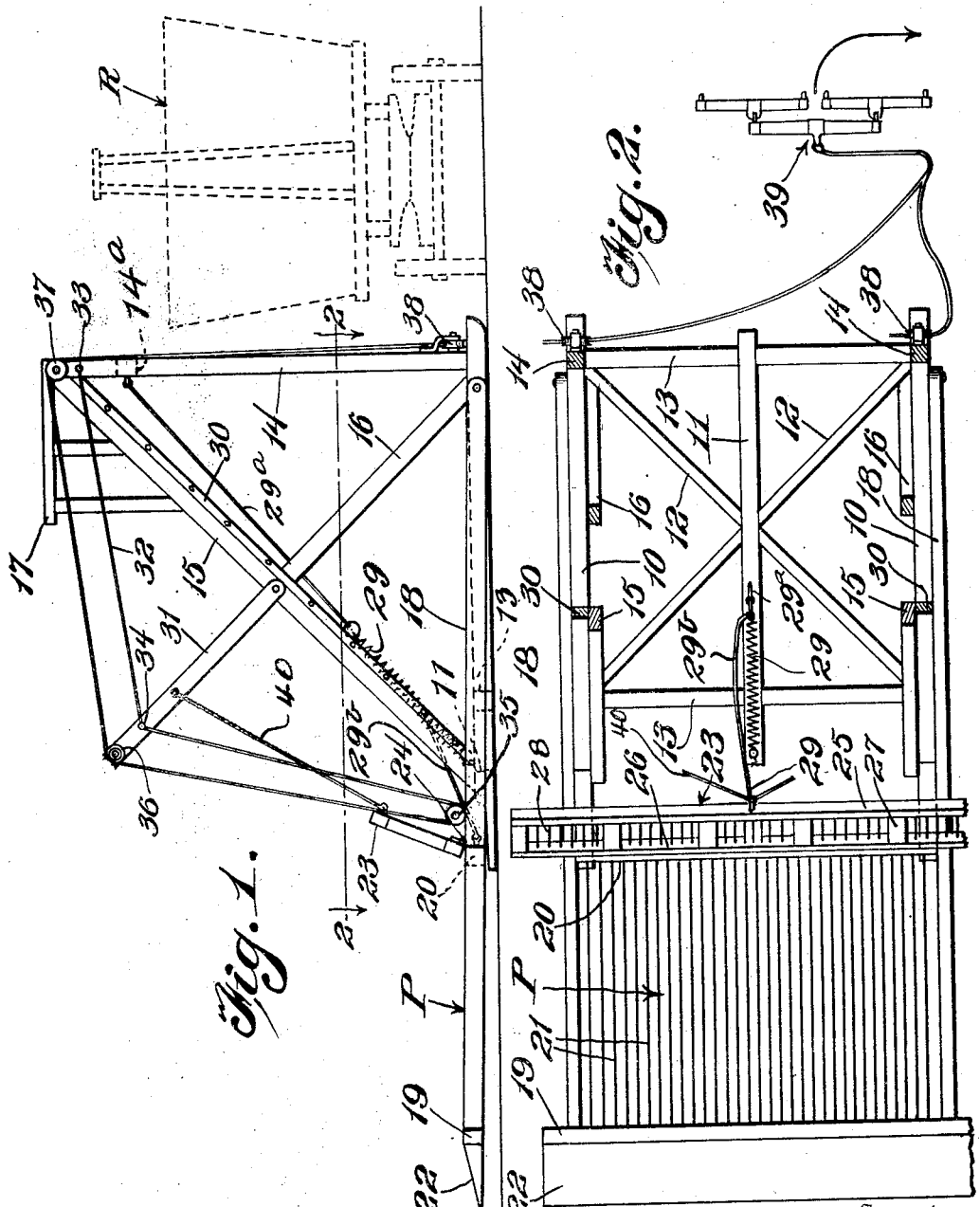

1,626,178

UNITED STATES PATENT OFFICE.

GEORGE JAMES BOWMAN, OF GLENBURN, CALIFORNIA.

HAY LOADER.

Application filed March 13, 1926. Serial No. 94,492.

This invention relates to hay loaders and more particularly to a device for loading hay into a hay rack carried by a wagon or truck.

An important object of the invention is the provision of a device of this character which may be very readily loaded with a buck rake or the like and which will pick up and deposit its load cleanly into the rack without spilling a portion of the contents thereof upon the ground.

A further object of the invention is the provision of a device of this character having a platform provided with an apron and means for swinging the platform through an arc of ninety degrees, means being provided for shifting the platform and for supporting the apron during such shifting and at all times so that the load is prevented from slipping from the platform as it rises to the vertical until the load is properly placed over the rack in which it is to be deposited.

A further object of the invention is to provide a device of this character having lifting cables which support the apron during a major portion of its travel and means for delivering the base and apron while the apron is still supported by the cables to a platform serving as a further support until the structure is properly positioned to dump its load.

These and other objects I attain by the construction shown in the accompanying drawings, wherein for the purpose of illustration is shown a preferred embodiment of my invention and wherein:—

Figure 1 is a side elevation of a hay loader constructed in accordance with my invention, the rack being indicated in position by the hay loader in dotted lines;

Figure 2 is a plan view of the hay loader;

Figure 3 is a side elevation thereof showing the steps of elevating and discharging the load from the platform;

Figure 4 is a fragmentary perspective of the platform.

Referring now more particularly to the drawings, the numerals 10 and 11 indicate the side and central base elements, the members 10 being preferably in the form of sled runners whereby the device may be transported from place to place. These members are suitably cross-braced to one another, as indicated at 12 and 13 respectively, to provide a rigid structure. Arising from the base structure adjacent corresponding ends of the members 10 are vertical supports 14, the upper ends of which are connected with the members 10 at points spaced from such ends by diagonal braces 15 secured to the inner faces of the members 10. Between these diagonal braces 15 and the member 10 a further brace 16 is arranged. From the upper ends of the supports 14 and from the diagonal brace 15 a platform 17 is supported. The vertical supports 14 are connected adjacent the upper ends thereof by a horizontal brace 14$^a$.

Adjacent the point of attachment of the vertical support 14 are platform arms 18, the outer ends of which project beyond the outer ends of the base members 10 and 11 and upon such projecting portions are connected outer and inner transverse members 19 and 20. These transverse members are in turn connected by wires 21 which provide a platform for the reception of the hay which is to be loaded. The outer ends of the arms 18 have their upper surfaces beveled, as at 22, to facilitate loading of the platform. An apron 23 is pivoted to the inner transverse member 20, as at 24, this apron including upper and lower transverse members 25 and 26, vertical members 27 connecting the upper and lower transverse members and wires 28 likewise connecting these members. To the cross brace 13 most nearly adjacent the platform, when in horizontal position, is connected one end of a coil spring 29, the opposite end of which is connected by a cable 29$^a$ to the horizontal brace 14$^a$ in such manner that the spring is continually under tension. The upper end of this spring is connected by a cable 29$^b$ to the center of the rear edge of the platform, this cable being of such length that when the arms 18 have risen a predetermined extent, the tension of the spring 29 is placed against the arms to resist their further movement.

To the outer faces of the diagonal braces 15 are secured metallic guides or rubbing strips 30 against which the arms 18 may bear for guidance as these arms are elevated. To the members 15 approximately midway of the length thereof are pivoted arms 31. Cables 32 are secured to the members 14 adjacent the tops thereof, as at 33, then to the arms 31 adjacent the ends thereof, as at 34, then pass about pulleys 35 secured to the arms 18 immediately adjacent the inner end of the platform, then about pulleys 36 secured to the outer ends of the arms 31 about pulleys 37 at the upper ends of the braces 14 and downwardly to guide pulleys 38 at the lower ends of these braces from which point they are led to a suitable means for attaching them to a source of power, such as a doubletree 39 or the like. The cables 32 and more particularly the runs thereof connecting the pulleys 35 and 36 provide a support for the apron 23, maintaining this apron horizontally disposed when the arms 18 are vertically disposed. The cables 40 connect the arms 31 with the upper edges of the apron 23.

In the use of the device, the rack R which is to be loaded is positioned so that it lies immediately adjacent the vertical members 14 and at the opposite side thereof from the platform 17. The hay is deposited upon the elevating platform P by a buck rake or the like (not herein disclosed) and power is applied to the cables 32. This power acts to cause the arms 18 to swing about their pivots with the result that the platform P is raised and finally the apron 23 comes into contact with the arms 31 and these arms move with the arms 18 toward the platform 17. During this period, the apron 23 is supported from the cables 32. As the arm 15 arrives at the vertical, what is then the forward edge of the apron is delivered upon the platform 17 and slides thereon during continued movement of the arms 18 until the platform P is vertically disposed and above the platform 17. The apron then being freed from the platform will swing downwardly upon its hinges, permitting the load to pass to the rack R. In returning the arms to their normal position, the initial movement of the arms 18 is obtained from the spring 29, the platform 17 supporting the apron 23 until it is engaged by the cables 32 between the pulleys 35 and 36 so that this apron is properly positioned. As the movement continues, the cables 40 are tightened and lift the arms 31 after which time the arms swing simultaneously until the arms 18 come to rest. It will be noted that the arms supporting the platform P swing through an arc of substantially ninety degrees and that the arms 31 are pivoted upon a radius of this arc substantially bisecting the arc. It will also be noted that the platform 17 is intersected by the arc described by the free ends of the arms 31. If these conditions are maintained, it is immaterial whether the particular manner of bracing illustrated in the drawings be retained, as the results provided will be identical.

It will be obvious that a device of this character may be very cheaply and readily produced and will be durable and efficient in service. It will also be obvious that the construction hereinbefore set forth is obviously capable of a certain range of change and modification without materially departing from the spirit of the invention and I accordingly do not limit myself to such specific structure except as hereinafter claimed.

I claim:—

1. In a hay loader, a base, a substantially horizontal platform supported above and from the base, a pair of arms pivoted to the base and swingable about the pivots thereof from a horizontal position where they substantially align with the base to a vertical position where they substantially align with the edge of the platform remote from the free ends of the arms when in the first named position, a second platform carried by the free ends of the arms and having a pivoted apron at its inner edge, said apron being movable to a position where it substantially aligns with the platform to permit dumping of the contents when the arms are in the vertical position, the first named platform supporting the free edge of the apron during passage of the apron thereover and means for moving said arms from the horizontal to the vertical position thereof including a part supporting said apron at substantially right angles to its platform until the free edge of said apron overlies the first named platform.

2. In a hay loader, a base, a substantially horizontal platform supported above and from the base, a pair of arms pivoted to the base and swingable about the pivots thereof from a horizontal position where they substantially align with the base to a vertical position where they substantially align with the edge of the platform remote from the free ends of the arms when in the first named position, a second platform carried by the free ends of the arms and having a pivoted apron at its inner edge, said apron being movable to a position where it substantially aligns with the platform to permit dumping of the contents when the arms are in the vertical position, the first named platform supporting the free edge of the apron during passage of the apron thereover, means for moving said arms from the horizontal to the vertical position thereof including a part supporting said apron at substantially right angles to its platform until the free edge of said apron overlies the first named platform, including supports substantially aligning with said edge of the first named platform, pulleys carried by the supports, cables trained over said pulleys and attached to said arms and means engaging the cables intermediate the pulleys and the points of their attachment to the arms for maintaining the section of the cable lying between said means and the arms perpendicular to the arms until the free edge of the apron overlies the first named platform.

3. In a hay loader, a base, a substantially horizontal platform supported above and from the base, a pair of arms pivoted to the base and swingable about the pivots thereof from a horizontal position where they substantially align with the base to a vertical position where they substantially align with the edge of the platform remote from the free ends of the arms when in the first named position, a second platform carried by the free ends of the arms and having a pivoted apron at its inner edge, said apron being movable to a position where it substantially aligns with the platform to permit dumping of the contents when the arms are in the vertical position, the first named platform supporting the free edge of the apron during passage of the apron thereover, means for moving said arms from the horizontal to the vertical position thereof including a part supporting said apron at substantially right angles to its platform until the free edge of said apron overlies the first named platform, including supports substantially aligning with said edge of the first named platform, pulleys carried by the supports, cables trained over said pulleys and attached to said arms and means engaging the cables intermediate the pulleys and the points of their attachment to the arms for maintaining the section of the cable lying between said means and the arms substantially perpendicular to the second platform until the free edge of the apron overlies the first named platform comprising pivoted arms engaged by the free edge of the apron and moved thereby during movement of the first named arms and in advance of the first named arms, the last named arms having pulleys over which the cables are passed.

4. In a hay loader, a base, a substantially horizontal platform supported above and from the base, a pair of arms pivoted to the base and swingable about the pivots thereof from a horizontal position where they substantially align with the base to a vertical position where they substantially align with the edge of the platform remote from the free ends of the arms when in the first named position, a second platform carried by the free ends of the arms and having a pivoted apron at its inner edge, said apron being movable to a position where it substantially aligns with the platform to permit dumping of the contents when the arms are in the vertical position, the first named platform supporting the free edge of the apron during passage of the apron thereover, means for moving said arms from the horizontal to the vertical position thereof including a part supporting said apron at substantially right angles to its platform until the free edge of said apron overlies the first named platform, including supports substantially aligning with said edge of the first named platform, pulleys carried by the supports, cables trained over said pulleys and attached to said arms and means engaging the cables intermediate the pulleys and the points of their attachment to the arms for maintaining the section of the cable lying between said means and the arms substantially perpendicular to the second platform until the free edge of the apron overlies the first named platform comprising pivoted arms engaged by the free edge of the apron and moved thereby during movement of the first named arms and in advance of the first named arms, the last named arms having pulleys over which the cables are passed, the last named arms being pivoted upon a radius of the arc of swing of the first named arms substantially bisecting the arc and being of less length than the first named arms.

5. In a hay loader, a base, a substantially horizontal platform supported above and from the base, a pair of arms pivoted to the base and swingable about the pivots thereof from a horizontal position where they substantially align with the base to a vertical position where they substantially align with the edge of the platform remote from the free ends of the arms when in the first named position, a second platform carried by the free ends of the arms and having a pivoted apron at its inner edge, said apron being movable to a position where it substantially aligns with the platform to permit dumping of the contents when the arms are in the vertical position, the first named platform supporting the free edge of the apron during passage of the apron thereover, means for moving said arms from the horizontal to the vertical position thereof including a part supporting said apron at substantially right angles to its platform until the free edge of said apron overlies the first named platform, including supports substantially aligning with said edge of the first named platform, pulleys carried by the supports, cables trained over said pulleys and attached to said arms and means engaging the cables intermediate the pulleys and the points of their attachment to the arms for maintaining the section of the cable lying between said means and the arms substantially perpendicular to the second platform until the free edge of the apron overlies the first named platform comprising pivoted arms engaged by the free edge of the apron and moved thereby during movement of the first named arms and in advance of the first named arms, the last named arms having pulleys over which the cables are passed, the last named arms being pivoted upon a radius of the arc of swing of the first named arms substantially bisecting the arm and being of less length than the first named arms and of less length than the distance between the pivot of the last named arms and said edge of the platform.

6. In a hay loader, a base, a substantially horizontal platform supported from and above the base, a pair of arms pivoted to the base and swingable about the pivots thereof from a horizontal position where they substantially align with the base to a vertical position where they substantially align with the edge of the platform remote from the free ends of the arm when in the first named position, a second platform carried by the free ends of the arms and having a pivoted apron at its inner edge and means for moving the second named platform from the horizontal to its vertical position including a part supporting the apron at substantially right angles to its platform until the free edge thereof overlies the first named platform.

In testimony whereof I hereunto affix my signature.

GEORGE JAMES BOWMAN.